United States Patent [19]

Oliver

[11] Patent Number: 4,485,778

[45] Date of Patent: Dec. 4, 1984

[54] METHOD AND MEANS FOR IMPROVING PERFORMANCE OF DIESEL ENGINES

[76] Inventor: Bernard M. Oliver, 13310 La Paloma Rd., Los Altos Hills, Calif. 94022

[21] Appl. No.: 403,882

[22] Filed: Jul. 30, 1982

Related U.S. Application Data

[63] Continuation of Ser. No. 125,200, Feb. 27, 1980, abandoned, which is a continuation-in-part of Ser. No. 063,537, Aug. 3, 1979, abandoned.

[51] Int. Cl.³ .............................................. F02F 3/14
[52] U.S. Cl. .................................... 123/254; 123/255; 123/270; 123/271
[58] Field of Search ............... 123/557, 254, 255, 270, 123/271

[56] References Cited

U.S. PATENT DOCUMENTS

| 1,502,926 | 7/1924 | Suter | 123/255 |
| 1,759,162 | 5/1930 | Lang | 123/256 |
| 1,926,499 | 12/1933 | Ricardo | 123/255 |
| 3,044,454 | 7/1962 | Sutton | 123/254 |
| 3,082,751 | 3/1963 | Kuntz | 123/254 |
| 3,762,378 | 10/1973 | Bitonti | 123/557 |
| 4,201,167 | 5/1980 | Bayley | 123/557 |
| 4,332,224 | 6/1982 | Latsch | 123/254 |

FOREIGN PATENT DOCUMENTS

| 917882 | 7/1949 | Fed. Rep. of Germany | 123/254 |
| 581009 | 11/1924 | France | 123/254 |
| 0151715 | 11/1979 | Japan | 123/270 |

Primary Examiner—Ronald H. Lazarus
Attorney, Agent, or Firm—A. C. Smith

[57] ABSTRACT

The operating efficiency of a Diesel engine is improved by method and means which prevaporize the injected fuel, and which establish initial combustion in a thermally-isolated, high-temperature chamber, and also which rely on various sources of heat in the operating engine to preheat the fuel to gaseous state prior to injection into the combustion chamber.

6 Claims, 9 Drawing Figures

METHOD AND MEANS FOR IMPROVING PERFORMANCE OF DIESEL ENGINES

CROSS REFERENCE TO RELATED APPLICATION

This is a continuation of application Ser. No. 125,200, filed Feb. 27, 1980, now abandoned, which is a continuation-in-part of Ser. No. 063,537, filed Aug. 3, 1979 now abandoned.

BACKGROUND OF THE INVENTION

Conventional Diesel engines commonly operate at lower maximum revolutions per minute than comparable gasoline engines. One reason is that the droplets of fuel injected at the end of a compression stroke mix slowly with the available oxygen, and this causes slower combustion than in a comparable gasoline engine where the air and fuel are premixed. In addition, unless there is more air than needed for stoichiometry, combustion in a Diesel engine will be incomplete and carbon particles will be exhausted as black smoke. Techniques to overcome these problems and to improve engine performance are described in the literature (see, for example, U.S. Pat. Nos. 3,353,520, 3,911,890, 3,977,376, 4,044,740, and 4,096,697).

SUMMARY OF THE INVENTION

In accordance with the present invention, the operation of a Diesel engine is improved by preheating the fuel while under pressure prior to injection into the combustion chamber, and by modifying the combustion chamber to provide an insulated, high-temperature initial combustion chamber.

DESCRIPTION OF THE PREFERRED EMBODIMENT

Figure 1:
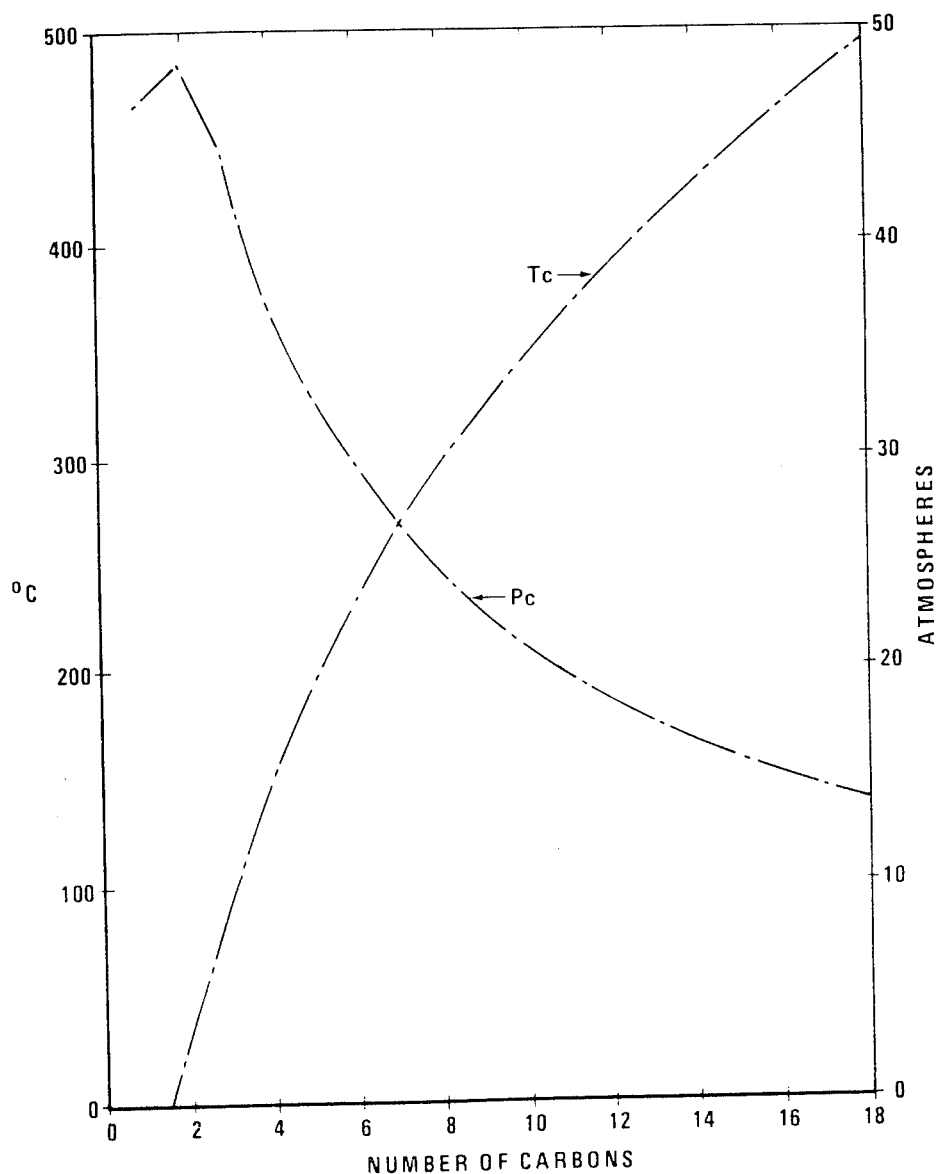
FIG. 1 is a graph showing the critical temperatures and pressures for the alkanes contained in Diesel fuel.

Diesel fuels typically contain components ranging from octane to hexadecane which vaporize at the critical temperatures and pressures shown in FIG. 1. An accordance with the present invention, the pressure in the fuel lines beyond the pump and the distributor is maintained above and about 20 atmospheres, and the fuel at the injection nozzle is heated to about 460° C. Under these conditions, the fuel is injected into the combustion chamber as a gas. This assures rapid, turbulent mixing with air in the combustion chamber. Although some of the heavier alkanes found in Diesel fuel begin to decompose at these high temperatures, the time constant of the decomposition is typically about 25 minutes. However, in accordance with the present invention the fuel is only subjected to these high-temperature conditions for a few seconds at most, and any decomposition products that do occur are not lost but are injected as fuel. As long as substantial amounts of tetradecane, pentadecane and hexadecane remain, the fuel will still ignite rapidly.

Prevaporization of the fuel according to the present invention before injection into the combustion chamber of a Diesel engine eliminates the liquid-gas interface commonly associated with fuel droplets in a conventional Diesel engine. The resulting mixing and burning of fuel vapors more nearly resemble the conditions in a gasoline engine. Thus, the prevaporization of fuel reduces the burning time, allows higher engine speeds and also results in more complete combustion with concomitant reductions in carbon monoxide and particulate exhaust emissions.

Figure 2:
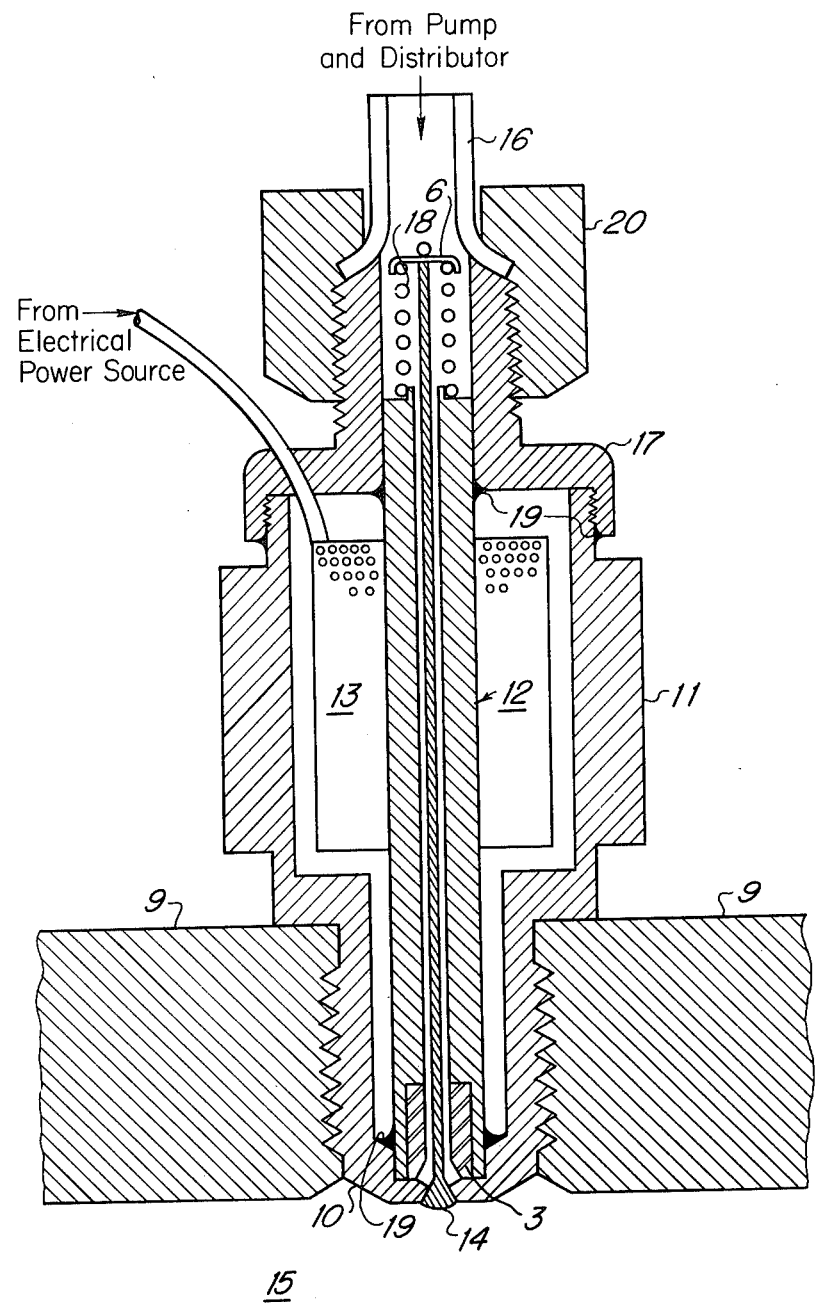
FIG. 2 is a sectional view of an injection nozzle, including a preheater, for a Diesel engine.
Figure 3:
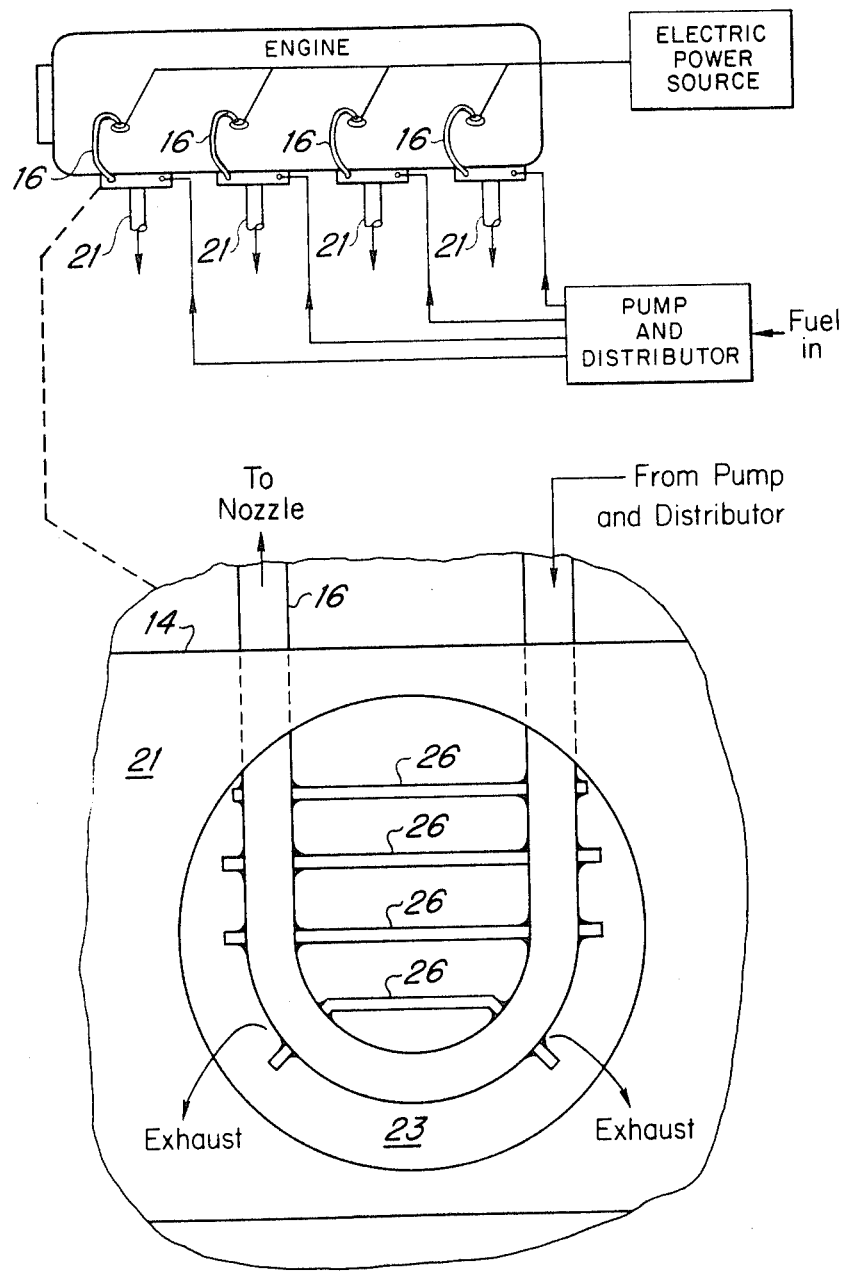
FIG. 3 is a preheating conduit for use with the injection nozzle of FIG. 2.

The pressurization and preheating of the fuel are accomplished according to one embodiment of the present invention using the injection nozzle illustrated in FIG. 2 and a preheater conduit shown in FIG. 3. The injection nozzle includes an outer housing 11 which is threaded into the cylinder head 9 and which contains an electrical heater 13 disposed about a copper tube 12. Flange 17 attaches to the outer housing 11 and supports the upper end of tube 12 and also carries a nut 20 which secures the flared conduit 16 to the assembly. The lower end of copper tube 12 has reduced cross section and is brazed or otherwise attached 19 to the outer housing 11 at its lower end. A thermal insulator such as ceramic is incorporated into the reduced cross section of copper tube 12 at the lower end thereof to minimize heat transfer from the heated fuel and the hot copper tube 12 to the cooler outer housing 11 and cylinder head 9. A spring-biased valve stem 14 seated in the lower end of the outer housing 11 forms a valve which prevents back-flow of gas from the combustion chamber 15 and which also provides pressure relief for fuel in conduit 16. The spring 18 on the valve stem 14 establishes an outlet or relief pressure for fuel in tube 12 in escess of, say, 20 to 30 atmospheres, and the electrical heater 13 heats the small quantity of fuel in the tube 12 to about 300° C.–500° C., depending upon the composition of the fuel being used.

Engine operation at high speeds requires electrical power supplied to the heater coils 13 associated with all cylinders of about 1 to 2 kilowatts to assure adequate preheating of the fuel above the critical temperature. This amount of power can be reduced appreciably by incorporating a preheater 21 into the conduit 16, as shown in FIG. 3. This preheater 21 is located adjacent to the exhaust port of a cylinder to transfer heat from the exhaust gases to the incoming pressurized fuel in conduit 16. The heat transfer is enhanced by brazing or otherwise attaching fins 26 to the conduit 16 which is disposed as a loop in the exhaust passage 23. This arrangement for preheating the fuel is self-regulating in that a higher rate of fuel flow is associated with higher exhaust temperature. Lower rates of fuel flow, for example, at idle and low enging speeds where the exhaust temperature is low may require additional heating by the electrical heater 13 illustrated in FIG. 2 to vaporize the fuel that is injected into the combustion chamber.

Figure 4:
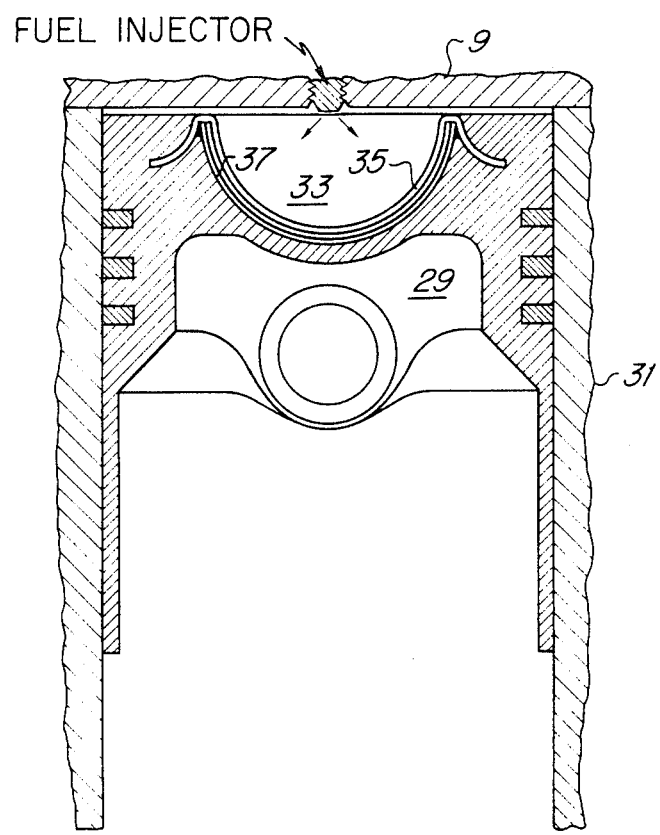
FIG. 4 is a sectional view of an improved piston for a Diesel engine according to the present invention.
Figure 5A:
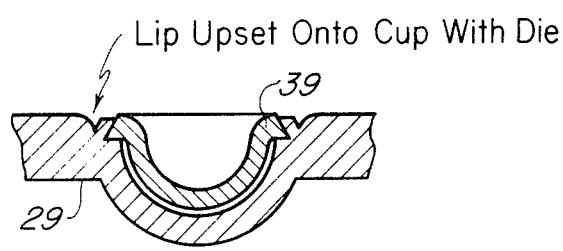
FIGS. 5a and 5b are sectional views of improved pistons according to other embodiments of the present invention.

Additional improvements in the operating efficiency of a Diesel engine are achieved according to the present invention by forming a high-temperature initial combustion region within the combustion chamber, as shown in FIGS. 4 and 5a, b. These embodiments of the invention improve combustion efficiency by providing a compact, high-temperature initial combustion chamber much of which is thermally insulated from the cooler, surrounding surfaces. In the top dead-center position of the piston 29 within the combustion chamber formed by cylinder walls 31 and cylinder head 9, as shown in FIG. 4, almost all of the residual volume is confined within the hemispherical chamber 33 in the top of the piston 29. The injected fuel initially burns within this thermally-insulated chamber 33 where high operating temperatures can be maintained for more efficient combustion. Although the last 160° or so of crankshaft rotation during a power stroke causes the combustion chamber to expand and reveal cooler, uninsulated cylinder walls 31, the initial 20° of rotation before top dead-center and the 20° of rotation after top dead-center occur with the piston positioned subsequently as indicated. Thus, almost all the initial burning of injected fuel occurs within the high-temperature hemispherical chamber 33. Fuel that contacts the hot chamber walls is ignited readily for more complete combustion with associated higher efficiency and lower levels of exhaust particulates.

In the embodiment of FIG. 4, the chamber 33 includes a pair of spaced, hemispherical cups, the inner one of which has a flange 36 and is made of high-temperature alloy or refractory metal. This inner cup may have about one inch outside radius and 1/16 inch thickness. The facing surfaces of the two cups 35, 37 may be polished and gold plated to increase infrared reflectivity. The two cups are then vacuum brazed around the periphery to form a "Dewar flask" that is then die-cast into the piston, as shown. This assembly serves to reduce heat flow away from the hot chamber walls to the cooler surfaces of the piston. It should be recognized that the chamber need not be a full hemisphere, since a shallower segment of a sphere will suffice. However, for minimum stress at the periphery, a hemisphere is preferred. The hemispherical cup need not be in the center of the piston top but may be moved off center to allow more clearance between the fuel injection nozzle and the valves. Or, the cup may be left centered and only the injection nozzle moved off center.

Figure 5B:
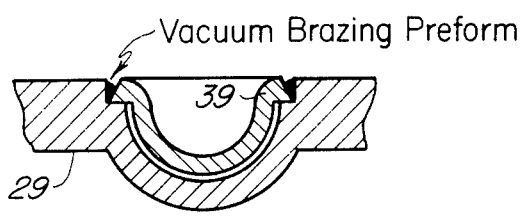

In the illustrated embodiments of FIGS. 5a and 5b, the hemispherical chamber 39 is formed of a ceramic material and is mounted in the top of the piston 29 at the periphery of the cup. The back side of the ceramic cup 39 is spaced away from the piston 29 to minimize the heat transfer to the cool piston from the hot chamber formed by the cup 39. Other techniques for mounting the ceramic cup 39 in the top of the piston 29 may also be used. For example, a copper ring may be inserted about the periphery of the cup to serve as a differential expansion gasket and to provide a gas-tight seal between the piston 29 and the back side of the cup 39.

Figure 6:
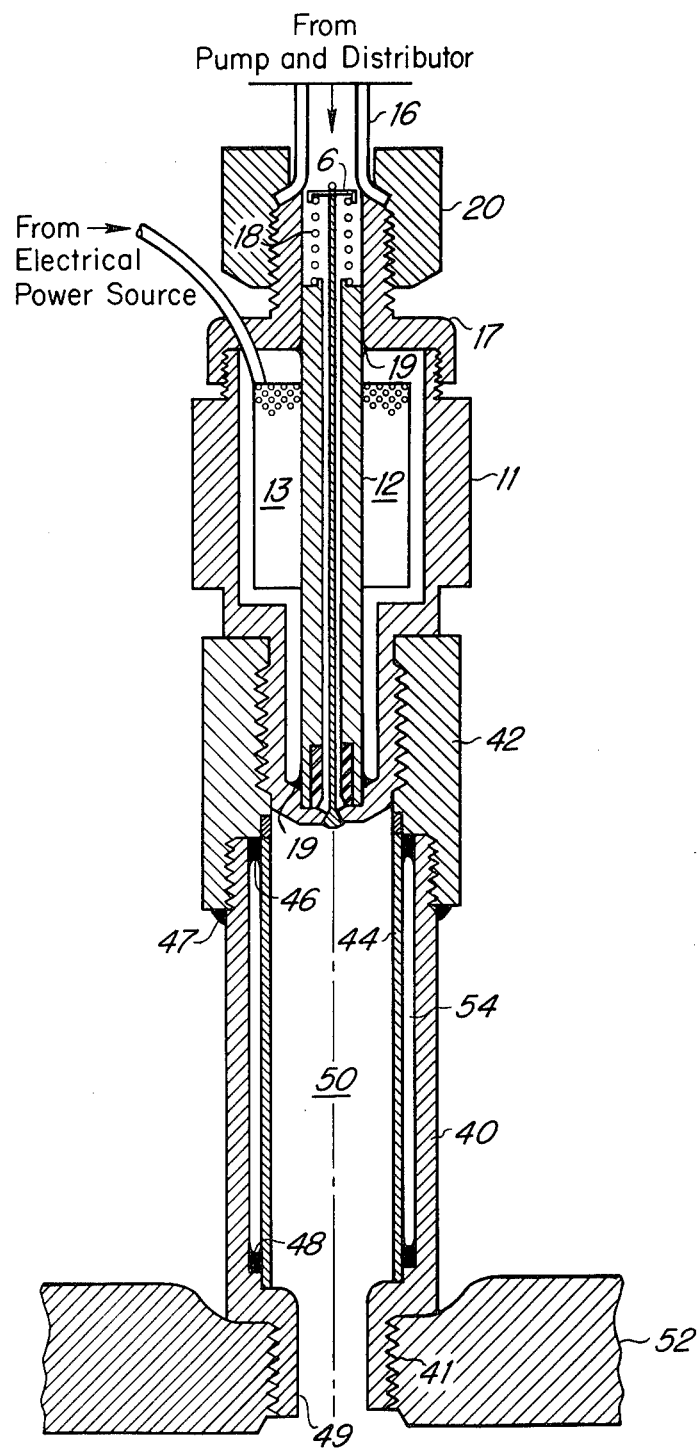
FIGS. 6 and 7 are cross-sectional views of precombustion chambers according to the present invention.
Figure 7:
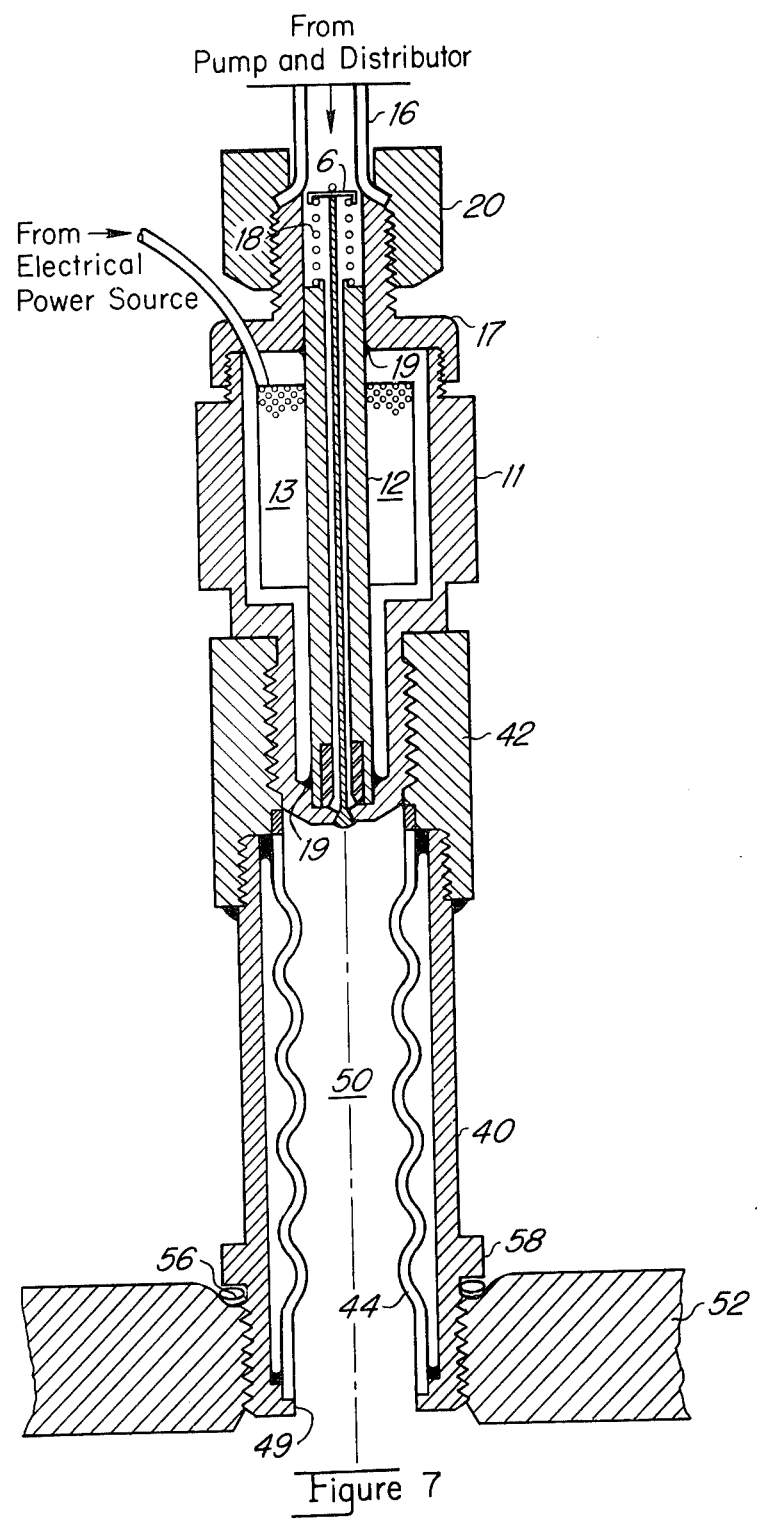

Of course, a thermally-insulated hemispherical chamber, as shown in FIGS. 6 and 7, may be located in the top of the cylinder head according to the present invention for cooperation with a flat-top piston instead of in the top of the piston for cooperation with a flat-top cylinder head, as described with respect to FIGS. 4, 5a and 5b. However, this configuration allows less room for valves in the head.

In the embodiment of the invention illustrated in FIGS. 6 and 7, the piston top and cylinder head 52 of a Diesel engine are both flat and have very little clearance at top dead center. Most of the volume of the compressed air charge is then contained in a combustion chamber 50 external to the cylinder. The fuel is injected into this combustion chamber 50 as the piston nears top dead center, and most of the burning takes place there. As the piston descends the hot gases surge into the cylinder to drive the piston down on the power stroke.

It will be recognized that heat loss from this external combustion chamber decreases the operating efficiency. It is therefore desirable to insulate the chamber according to the present invention in a manner similar to the hemispherical internal combustion chamber previously described. In the embodiment of FIG. 6, an insulated external combustion chamber includes a metal body 40 which is threaded at the bottom end 41 for insertion into a mating threaded hole in the cylinder head 52. A cap 42 is attached to the body 40 in a manner which positions and holds a high-temperature alloy tube 44. The tube is sealed to the cap with braze 46 and the cap and body are brazed together with braze 47. The assembly is then inverted and the tube and body are vacuum brazed together by braze 48 to form an evacuated region 54 between the tube 44 and body 40.

The outer surface of tube 44 and the inner surface of the body are polished and may be gold plated to reduce infrared radiation. The evacuated region and the polished surfaces thus form an insulating layer so that tube 44 may operate at very high temperatures without appreciable heat loss to the cooler cylinder head 52. By making the tube 42 relatively long and skinny, the wall thickness may be reduced and this reduces the heat loss by conduction to the cap and body.

Various modifications of the arrangement shown in FIG. 6 are possible. For example, the tube 44 may be carried nearly to the end of the threaded section 41 of the body 40, as shown in FIG. 7. This further reduces the heat loss to the body but may require that a gasket and shoulder 56, 58 be added. Also, it may be necessary to corrugate the tube 44, as shown in FIG. 7, to reduce thermal stresses from its longitudinal expansion and contraction.

Figure 8:
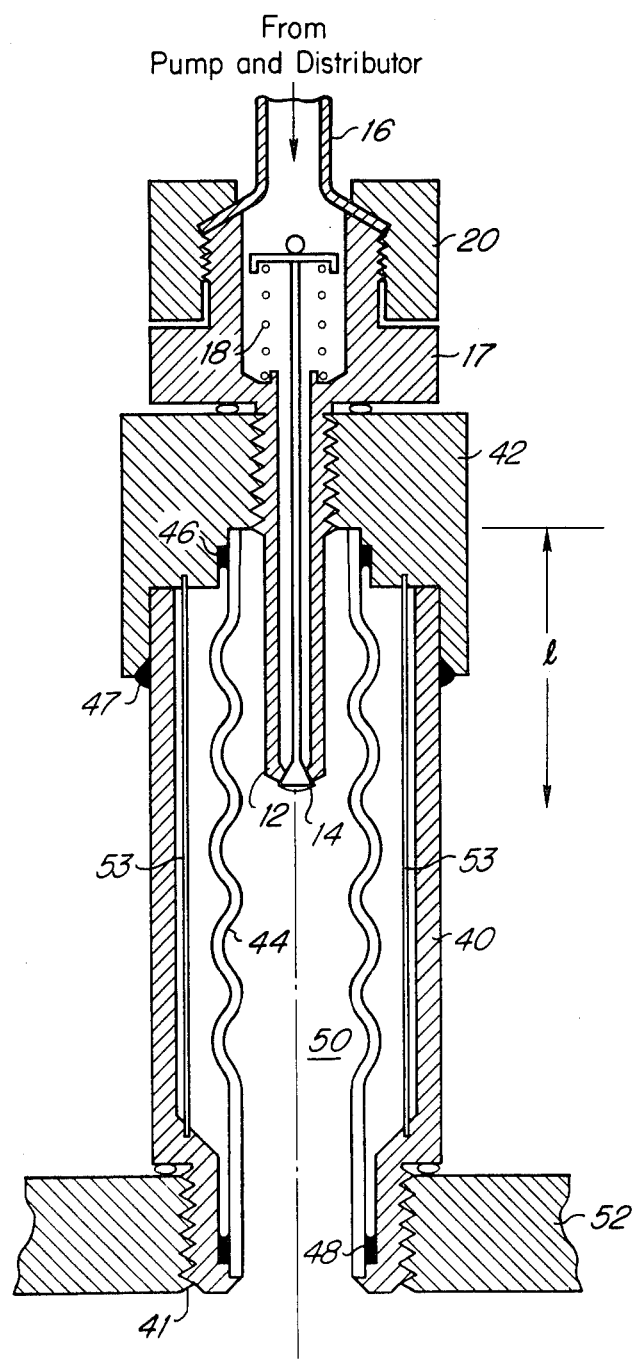
FIG. 8 is a sectional view of an improved injection nozzle having a self-heated nozzle extending into the precombustion chamber.

Referring to the illustrated embodiment of FIG. 8, there is shown an improved external precombustion chamber having a fuel injection nozzle positioned to extend into the chamber a sufficient distance 1 to provide preheating to the vapor phase of the small amount of fuel contained within the nozzle. As in the illustrated embodiment of FIG. 6, the external combustion chamber includes a metal body 40 which is threaded at the bottom end 41 for insertion into a mating threaded hole in the cylinder head 52. A cap 42 is attached to the body 40 in a manner which positions and holds a high-temperature alloy tube 44. The tube is brazed 46 to the cap 42 and the cap and body are brazed 47. The region between body 40 and tube 44 is evacuated and the tube is then brazed 48 to the body 40.

The fuel injector includes housing 17 which is threaded into the cap 42 to position the attached nozzle 12 within the chamber 50 formed by tube 44. The fuel line 16 from the pump and distributor is flanged and secured in fluid-tight relationship to the housing 17 by a mating flange nut 20. The spring 18 positioned around the stem of outlet valve 14 determines the outlet or relief pressure for fluid flowing through the nozzle into the chamber 50.

The outlet end 14 of the nozzle 12 is positioned within the chamber 50 a sufficient distance 1 away from the cooler housing 42 to assure that the small amount of fuel that is under pressure within the nozzle can be vaporized by the available heat within the chamber 50 just before it is injected. The heating of the nozzle 12 and of the fuel contained within it tends to be self-regulating in that an increase in the power output of the engine provides increased heating of the fuel which is injected into chamber 50 at the increased rate required to support the increased power output of the engine.

Heat loss from the chamber 50 can be reduced by introducing one or more heat shields 53 within the evacuated region between the tube 44 and the body 40 (only one shown for clarity). These heat shields are each mounted using as little contact as possible with the body 40 and tube 44, and with each other so that the temperatures at which the heat shields operate are determined predominantly by radiation equilibrium and not by thermal conduction. Each of the heat shields 53 may include radiation-reflective coatings such as gold plating on the surfaces to reduce the radiation heat loss from the tube 44. It can be shown that a number n of heat shields so mounted between the tube 44 and the body 40 provides an n-fold reduction in radiated heat loss from tube 44.

Therefore, the method and means of the present invention improve the operating efficiency of a Diesel engine by improving the mixing of air and fuel injected into the combustion chamber as a vapor, and by providing a high-temperature chamber for the initial combustion of the fuel upon exposure to air within the high-temperature chamber when the piston is near the top of the compression stroke.

I claim:

1. Apparatus for a Diesel engine having an expandable combustion chamber, comprising:
   a housing disposed to be attached to a boundary wall of the combustion chamber, and having an internal recess therewithin;
   an insert mounted within the internal recess to form a permanently evacuated region between the outer surface of the insert and the surface of the internal recess and to form an initial combustion chamber that is substantially surrounded by the inner surface of the insert and that communicates with a combustion chamber; and
   fuel inlet means attached to the housing and disposed to introduce fuel into the initial combustion chamber, said fuel inlet means extending by a selected length into the initial combustion chamber for transferring heat from the initial combustion chamber to the quantity of fuel contained within said selected length prior to being introduced into the initial combustion chamber.

2. Method of improving operation of a Diesel engine comprising the steps of:
   forming an initial combustion chamber external to the expandable combustion chamber of the engine and in fluid communication therewith, thermally insulating the initial combustion chamber by establishing a permanently evacuated region about the initial combustion chamber; and
   extending a selected length of conduit for fuel into the initial combustion chamber for transferring heat from the initial combustion chamber to the quantity of fuel contained within the selected length of conduit prior to being introduced into the initial combustion chamber to assure injection of the fuel into the initial combustion chamber in the gaseous state.

3. An improved Diesel engine having an expandable combustion chamber and comprising:
   an initial combustion chamber disposed in a cylinder head that forms a boundary wall of the combustion chamber, said initial combustion chamber forming a recess within the boundary wall;
   an element disposed within the recess having an outer surface spaced from the surface of the recess and having an inner surface which communicates with the combustion chamber;
   shield means interposed between said element and the surface of the recess for reflecting back the heat radiated by the element;
   means forming a permanently evacuated region about the outer surface of the element to enable the inner surface thereof to operate at substantially higher temperature than the boundary walls of the combustion chamber; and
   fuel inlet means disposed to introduce fuel into the region of the initial combustion chamber bounded by the inner surface of said element.

4. An improved Diesel engine as in claim 3 wherein said shield means includes a selected number of surrounding reflectors disposed in the evacuated region between the surface of the recess and the element to reflect radiated heat back toward said element.

5. Apparatus for a Diesel engine having an expandable combustion chamber, comprising:
   a housing disposed to be attached to a boundary wall of the combustion chamber, and having an internal recess therewithin;
   an insert mounted within the internal recess to form a permanently evacuated region between the outer surface of the insert and the surface of the internal recess and to form an initial combustion chamber that is substantially surrounded by the inner surface of the insert and that communicates with a combustion chamber;
   at least one heat shield interposed between the outer surface of the insert and the boundary walls of the internal recess to reflect back toward the insert the heat which is radiated thereby; and
   fuel inlet means attached to the housing and disposed to introduce fuel into the initial combustion chamber.

6. An improved Diesel engine having an expandable combustion chamber and comprising:
   insert means recessed within the top surface of a piston that forms a movable boundary wall of the combustion chamber to form an initial combustion chamber therein, said insert means having an inner surface which communicates with the combustion chamber and which is thermally insulated from the piston;
   means forming a permanently evacuated region about the outer surface of the insert means to enable the inner surface thereof operate at substantially higher temperature than remaining portions of the boundary walls of the combustion chamber; and
   fuel inlet means disposed to introduce fuel into the region of the initial combustion chamber bounded by the inner surface of said element said insert means including a pair of substantially hemispherical cups having surfaces disposed is facing space relationship to form a chamber therebetween; and means joining the cups and sealing said chamber therebetween to thermally insulate the surface that communicates the combustion chamber from the surrounding portions of the piston.

* * * * *